United States Patent [19]

Getts

[11] 4,255,858
[45] Mar. 17, 1981

[54] JIG SAW WITH ORBITALLY MOVABLE BLADE

[76] Inventor: Sidney A. Getts, 1923 N. Church St., Rockford, Ill. 61103

[21] Appl. No.: 49,427

[22] Filed: Jun. 18, 1979

[51] Int. Cl.³ .............................................. B27B 19/00
[52] U.S. Cl. ........................................ 30/393; 83/776
[58] Field of Search ......................... 30/392, 393, 394; 83/772, 776, 778

[56] References Cited

U.S. PATENT DOCUMENTS

| 3,156,837 | 11/1964 | Weller | 30/393 X |
| 3,905,105 | 9/1975 | Tuke | 30/393 |
| 3,978,862 | 9/1976 | Morrison | 30/393 |

*Primary Examiner*—Jimmy C. Peters
*Attorney, Agent, or Firm*—Leydig, Voit, Osann, Mayer & Holt, Ltd.

[57] ABSTRACT

The blade of a jig saw is mounted in a holder which is moved up and down by a rotary eccentric. A stack of leaf springs is cantilevered on the frame of the machine and is attached rigidly to the holder to cause the blade to move in a substantially elliptical orbit.

9 Claims, 7 Drawing Figures

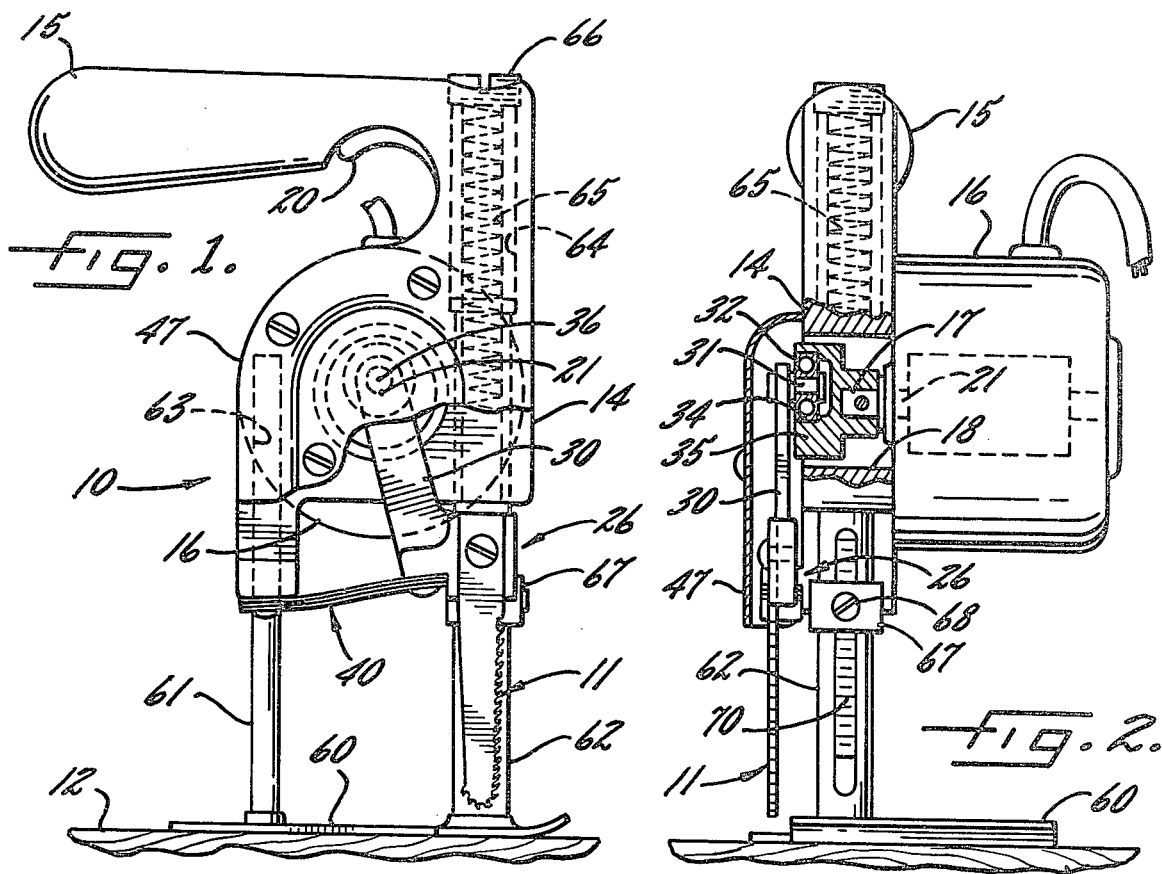
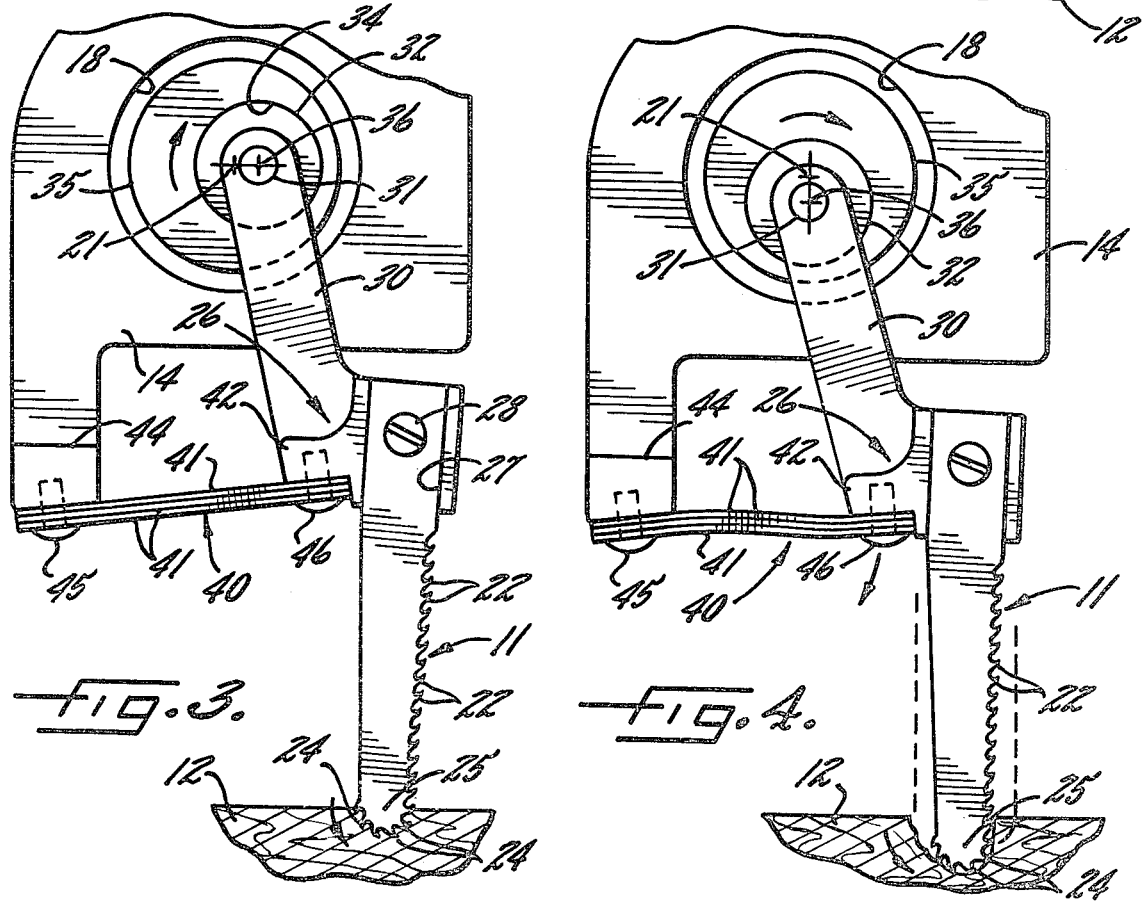

JIG SAW WITH ORBITALLY MOVABLE BLADE

BACKGROUND OF THE INVENTION

The invention relates generally to a power driven saw and more particularly to a jig saw or saber saw. As is well known, a jig saw includes an elongated blade which, in many instances, is simply reciprocated back and forth to produce the cutting action. In other saws, the blade is moved in a substantially elliptical orbit so as to cause the saw teeth to cut into the work during one half of the stroke and to pull free of the work during the return stroke.

The present invention relates to the latter type of saw. Because the blade pulls free of the work during the return stroke, the teeth do not rub reversely against the work and, in addition, sawdust and waste chips are more effectively removed from the cut. By forming teeth around the tip of the orbitally movable blade, the blade can be used for plunge cutting as well as for conventional cutting.

Back and forth movement of the blade preferably is produced by a rotary eccentric which is connected to the holder of the blade and which is adapted to be driven by a motor. Various types of mechanisms have been used in conjunction with eccentrics to cause the blade to move with orbital motion.

SUMMARY OF THE INVENTION

The general aim of the present invention is to provide a new and improved jig saw in which orbital movement of the blade is produced by a novel mechanism which significantly reduces vibration of the blade at high speeds and which, at the same time, experiences low wear and requires no lubrication.

A related object is to achieve the foregoing by providing a jig saw in which a resiliently yieldable strap uniquely coacts with an eccentric to effect orbital movement of the blade, the strap dampening vibration of the blade and being subject to little or no wear.

A more detailed object is to provide a jig saw in which the resiliently yieldable strap is in the form of a stack of leaf springs which are cantilevered on the main support of the saw and which preferably are attached rigidly to the holder for the blade. As the eccentric moves the blade holder back and forth, the leaf springs constrain the holder and cause the holder to oscillate so as to produce the orbital motion.

A further object is to provide a jig saw which is capable of plunge cutting in a smooth and fast manner.

Still another object is to provide a saw having a novel adjustable foot for controlling the depth of the plunge cut.

These and other objects and advantages of the invention will become more apparent from the following detailed description when taken in conjunction with the accompanying drawings.

BRIEF DESCRIPTION OF THE DRAWINGS

FIG. 1 is a side elevational view of a new and improved jig saw incorporating the unique features of the present invention, parts of the saw being broken away and shown in section.

FIG. 2 is a front elevational view, partly in cross-section, of the saw shown in FIG. 1.

FIG. 3 is an enlarged fragmentary view similar to FIG. 1 and shows certain parts of the saw in moved positions.

FIG. 4 is a view similar to FIG. 3 but shows parts of the saw in still further moved positions.

DETAILED DESCRIPTION OF THE PREFERRED EMBODIMENT

Figure 5:
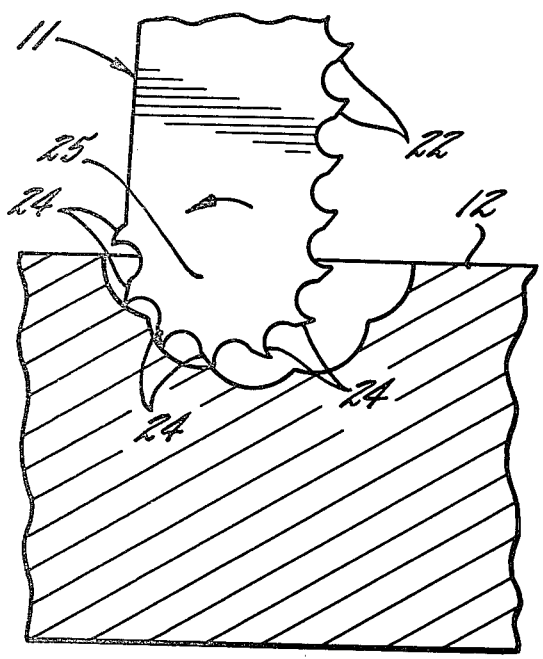
FIGS. 5 and 6 are enlarged side elevational views of the blade and show successive positions of the blade during a cutting operation.

As shown in the drawings for purposes of illustration, the invention is embodied in a power-driven saber saw or jig saw 10 having an elongated blade 11 adapted to be moved back and forth at high speeds to cut a workpiece 12. The saw includes a main support or frame plate 14 having a handle 15 which may be used to hold the saw. An electric motor 16 is attached to one side of the frame plate 14 and includes a rotary shaft 17 (FIG. 2) which projects into an opening 18 in the frame plate. By squeezing a trigger 20 (FIG. 1) which is associated with the handle, the motor may be energized to rotate the shaft at relatively high speed (e.g., 10,000 RPM) and in a clockwise direction (FIG. 3) about the axis 21 of the shaft.

The blade 11 is made of metal and is located in an upright position near the lower forward corner of the frame plate 14. Teeth 22 (FIG. 5) are formed along the forward edge of the blade and are raked so as to cut on the upstroke of the blade. Additional teeth 24 also are formed around the convexly curved tip 25 of the blade and are raked in a forward sense. The teeth 24 extend in an arcuate row around the tip with the uppermost tooth at the rear edge of the tip facing downwardly and with the uppermost tooth at the forward edge of the tip facing upwardly. As will be explained subsequently, the teeth 24 enable the blade 11 to be plunged downwardly into the workpiece 12 from the upper surface thereof.

As shown in FIG. 3, the blade 11 extends downwardly from a holder 26 and its upper end portion is received within an opensided slot 27 which is formed in the holder. A screw 28 extends through the upper end portion of the blade and is threaded into the holder to captivate the blade releasably in the slot.

The holder 26 is formed with an arm 30 which extends upwardly and rearwardly with respect to the upper end of the blade 11 adjacent the rear edge thereof. At its upper end portion, the arm 30 is secured to a pin 31 which is journaled within a bearing 32. The latter is secured within a cavity 34 formed in a flywheel 35 which is attached securely to the shaft 17 of the motor 16 so as to rotate with the shaft. The axis 36 (FIG. 3) of the pin 31 is spaced radially from the axis 21 of the shaft 17 and thus the pin defines an eccentric. The eccentric pin 31 turns about the axis 21 of the shaft 17 and is capable of turning within the bearing 32. As the shaft rotates, the eccentric pin causes the holder 26 and the blade 11 to move upwardly and downwardly.

In accordance with the present invention, the blade 11 is not merely reciprocated with a straight up and down motion but instead is caused to move in a substantially elliptical orbit by a resiliently yieldable strap 40 which is uniquely connected between the frame plate 14 and the holder 26. When the holder is moved upwardly and downwardly by the eccentric pin 31, the strap 40 constrains the holder and causes the holder to oscillate forwardly and rearwardly so that the blade undertakes a substantially elliptical motion. By virtue of its resiliency, the strap dampens vibration which tends to result from up and down movement of the blade and enables the blade to be driven at relatively high speeds without hammering at the ends of its stroke. Moreover, the strap is secured to the frame plate 14 and the holder 26 in a manner which eliminates wear points and the need for lubrication. Accordingly, the saw 10 is comparatively durable and trouble-free in service use.

More specifically, the strap 40 is preferably but not necessarily formed by a stack of leaf springs 41 (FIG. 3), there herein being three springs disposed in face-to-face relation. The springs extend transversely between a pad 42 on the lower rear corner of the holder 26 and a pad 44 on the lower rear corner of the frame plate 14 and are disposed in a plane which is substantially perpendicular to the plane occupied by the blade 11. Being so disposed, the springs are capable of flexing upwardly and downwardly (i.e., toward and away from the shaft 17) as the blade is moved upwardly and downwardly.

In carrying out the invention, the rear end portions of the springs 41 are cantilevered on and are attached rigidly to the pad 44 of the frame plate 14. For this purpose, a screw 45 (FIG. 3) extends through the rear end portions of the springs and is threaded into the pad. In addition, the forward end portions of the springs are preferably but not necessarily attached rigidly to the pad 42 of the holder 26. In the present instance, such attachment is effected by a screw 46 which extends through the forward end portions of the springs and which is threaded into the pad 42. By virtue of the ends of the springs being attached rigidly to the pads, no wear occurs at the attachment points and no lubrication is required.

The opening 18, the holder 26 and the strap 40 may be covered by a shield 47 (FIG. 2) which is attached to the frame plate 14. The strap, however, need not necessarily be covered since sawdust and the like does not encumber effective operation of the strap.

When the shaft 17 is rotated in a clockwise direction, the eccentric 31 moves between top dead center and bottom dead center to produce downward and upward movement of the blade 11 and the holder 26. As the blade moves upwardly and downwardly, the springs 41 constrain movement of the holder and cause the holder to oscillate forwardly and rearwardly. This causes the blade to move in an orbit whose shape approximates that of an ellipse. The elliptical path is elongated in the vertical direction, is shallow in the horizontal direction and is much the same as the path which the blade would follow if the springs 41 were replaced by a link having its ends pivotally connected to the pads 42 and 44 to turn about horizontal axes.

Figure 6:
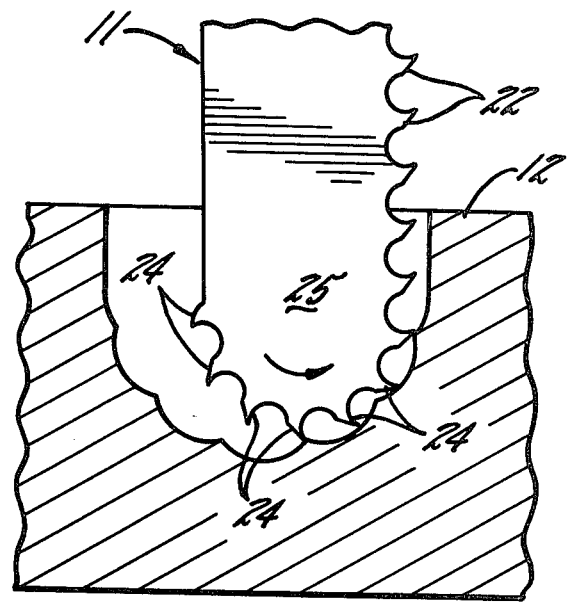

As the blade 11 is moved through its downstroke, its lower end portion swings rearwardly from the position shown in FIG. 1 to the position shown in FIG. 3. As the blade approaches the lower end of its downstroke, the tip 25 of the blade is oscillated forwardly or counterclockwise to cause the teeth 24 around the lower rear portion of the blade to cut into the workpiece 12 as shown in FIG. 5. When the blade completes its downstroke and starts through its upstroke, the teeth 22 on the forward edge of the blade cut the work and, in addition, the teeth 25 around the forward portion of the tip cut into the bottom of the slot being formed in the work (see FIG. 6). It is important to note that the teeth 24 cut during both the upstroke and the downstroke while the teeth 22 are in cutting contact with the work only during the upstroke. During the downstroke, the teeth 22 are swung rearwardly out of engagement with the forward side of the cut. This avoids contact between the teeth and the work during the non-cutting stroke so as to reduce wear of the blade and to promote a better flow of sawdust and chips.

Figure 7:
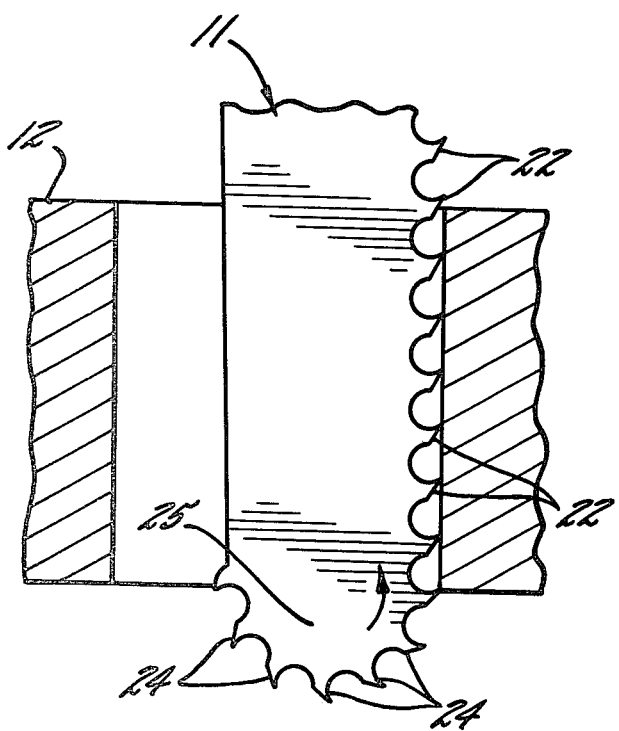
FIG. 7 is a view similar to FIG. 5 and further shows the cutting action of the blade.

The orbital motion enables the teeth 24 on the tip 25 of the blade 11 to be effectively plunged into the workpiece 12. Thus, slots and grooves of various shapes can be formed. FIG. 7 shows the blade cutting a slot in the workpiece.

To facilitate an understanding as to the manner in which the springs 41 dampen vibration, let it be assumed that the eccentric pin 31 is approaching top dead center and is moving the blade 11 through its upstroke. As the eccentric pin approaches top dead center and the blade moves upwardly, the springs 41 are flexed into a generally S-shape configuration as shown in FIG. 1 and are resiliently loaded. As a result, the springs absorb energy as the upwardly moving blade decelerates and comes to a stop. This cushions the stopping movement and avoids an abrupt shock load or hammering.

As the eccentric pin 31 starts around top dead center to move the blade 11 downwardly, the loaded springs relax and resiliently urge the blade downwardly. The springs thus assist in causing the blade to accelerate.

When the blade 11 is moving downwardly and the eccentric pin 31 is approximately 90 degrees from top dead center, the springs assume a substantially straight condition as shown in FIG. 3. Then as the pin rotates toward bottom dead center, the springs flex to a substantially reverse S-shape as shown in FIG. 4. Such flexing again loads the springs so that the springs dampen deceleration of the blade and cushion shock as the blade comes to the stop at the bottom of its downstroke. As the blade starts upwardly, the springs again relax and flex reversely to assist initial upward movement of the blade. The springs assume a substantially straight condition after the pin 31 has rotated approximately 90 degrees from bottom dead center and then flex to the shape shown in FIG. 1 as the pin approaches top dead center so as to dampen deceleration of the blade at the top of its upstroke.

Thus, the springs 41 are loaded and absorb energy as the blade 11 approaches the ends of its upstroke and downstroke and then rebound and impart energy to the blade as the latter begins to move through its downstroke and upstroke. Accordingly, the springs enable the blade to be reciprocated at high speed and with very little vibration being imparted to the frame plate 14.

A stack of several springs 41 is preferred in order to avoid fatigue failures which could result if the strap 40 were formed by a single spring. Also, a stack of springs is more rigid in an endwise direction than is a single spring and thus the stack of springs more effectively confines the blade for movement in the desired orbit.

Means are provided for controlling the depth to which the blade 11 cuts and are selectively adjustable to enable cuts of different depths to be established. Herein, these means comprise a depth control foot 60 (FIGS. 1 and 2) which is in the form of a generally horizontal plate located beneath the frame plate 14. The foot 60 is located at the lower ends of a pair of posts 61 and 62 which are guided for up and down sliding within a pair of openings 63 and 64, respectively, in the frame plate 14. The post 62 is tubular and receives a coil spring 65 which is compressed between the lower end of the post 62 and a threaded plug 66 at the upper end of the opening 64. A collar 67 is telescoped over the lower end portion of the post 62 and is adjustably secured to that post by a screw 68. The collar 67 is located beneath the frame plate 14.

To establish the depth of cut, the collar 67 is adjusted to a desired vertical position along the post 62 and then is secured in that position by the screw 68. A calibrated scale 70 (FIG. 2) may be formed on the post 62 to facilitate positioning of the collar 67.

Once the collar 67 has been secured in the desired position, the frame plate 14 is simply moved downwardly and the blade 11 plunges into the workpiece 12 until the lower end of the frame plate contacts and is stopped by the collar. As long as the frame plate is manually pushed downwardly, the blade will saw at a constant depth determined by the position of the collar. When downward manual pressure is released from the frame plate, the spring 65 automatically returns the frame plate and the blade upwardly to the position shown in FIG. 1.

If desired, a manually releasable latch may be provided to hold the frame plate 14 in engagement with the collar 67. Also, the collar may be eliminated and the frame plate may be held releasably in a selected position along the post by a friction lock or the like.

From the foregoing, it will be apparent that the present invention brings to the art a new and improved jig saw 10 in which the resiliently yieldable springs 41 confine the blade 11 for orbital movement while reducing vibration of the saw. Since the springs 41 do not have bearings, pivot points or the like, the springs require no lubrication and operate effectively over a long period of time even though repetitively exposed to sawdust.

I claim:

1. A saw having a support, a power driven shaft mounted on said support to rotate about a predetermined axis, a holder attached turnably to said shaft at a location disposed eccentrically of said axis, means for attaching an elongated saw blade to said holder, and a resiliently yieldable strap joined to said support and said holder to cause said holder to move in a substantially elliptical orbit during rotation of said shaft, said strap comprising a stack of leaf springs disposed in face-to-face relation, each of said springs having one end anchored to said support and having an opposite end joined to said holder.

2. A saw having a support, a power driven shaft mounted on said support to rotate about a predetermined axis, an eccentric rotatable with said shaft and having an axis spaced radially from the axis of the shaft, a holder, means for attaching an elongated saw blade to said holder, said holder being connected to said eccentric and being turnable about the axis of the eccentric, and a resiliently yieldable strap having one end portion cantilevered on said support and having an opposite end portion joined to said holder, said strap comprising a stack of leaf springs disposed in face-to-face relation, each of said springs having one end anchored to said support and having an opposite end joined to said holder, said strap and said eccentric coacting to cause said holder to move with orbital motion during rotation of said shaft.

3. A saw as defined in claim 2 in which the ends of each of said springs are attached rigidly to said support and said holder.

4. A saw having a support, a power driven shaft mounted on said support to rotate about a predetermined axis, an eccentric rotatable with said shaft and having an axis spaced radially from the axis of the shaft, a holder, an elongated saw blade supported by and extending from said holder, said holder having an arm extending generally opposite of said blade and connected to said eccentric to turn about the axis thereof, and a stack of leaf springs extending transversely of said blade and said arm and positioned so as to flex toward and away from said shaft, each of said springs having one end portion cantilevered rigidly on said support and having an opposite end portion joined rigidly to said holder, said springs and said eccentric causing said holder and said blade to move with orbital motion during rotation of said shaft.

5. A saw as defined in claim 4 in which teeth are formed along one side edge of said blade and also around the nose thereof so as to enable said blade to make a plunge cut during said orbital motion.

6. A saw as defined in claim 5 further including a depth control foot located adjacent said blade, means mounting said support on said foot to move toward and away from the foot, means urging said support away from said foot, and adjustable means for stopping said support in different selected positions when said support is moved toward said foot.

7. A saw having a support, a power driven shaft mounted on said support to rotate about a predetermined axis, a holder attached turnably to said shaft at a location disposed eccentrically of said axis and adapted to be moved through a working stroke during rotation of said shaft, and means for attaching an elongated saw blade to said holder, a resiliently yieldable strap joined to said support and said holder to control movement of said holder as the latter moves through said stroke, said strap being located so as to be stressed in one direction when said holder is at one end of said stroke and to be stressed in the reverse direction when said holder is at the other end of said stroke.

8. A saw as defined in claim 7 in which said strap has one end portion cantilevered on said support and has an opposite end portion joined to said holder, said strap causing said holder to move with substantially elliptical orbital motion during rotation of said shaft.

9. A saw as defined in either of claims 7 or 8 in which said strap comprises a stack of leaf springs disposed in face-to-face relation, each of said springs having one end anchored to said support and having an opposite end joined to said holder.

* * * * *